April 14, 1959   J. E. FOSTER   2,882,384
WELDING SYSTEM
Filed Dec. 23, 1953   8 Sheets-Sheet 1
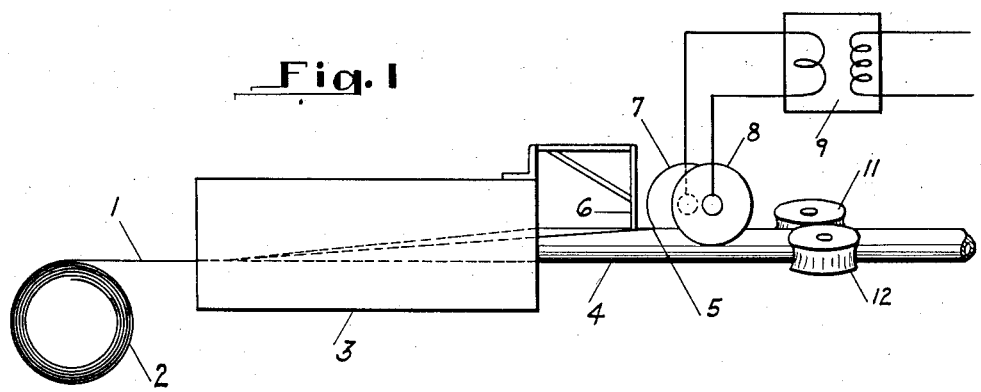
Fig. 1
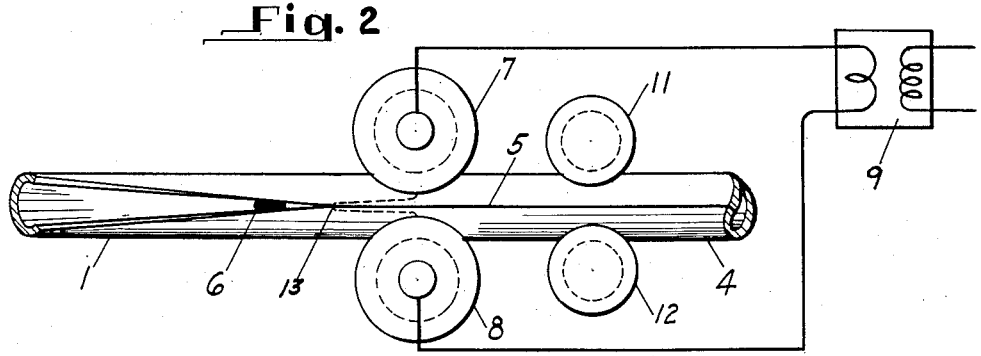
Fig. 2
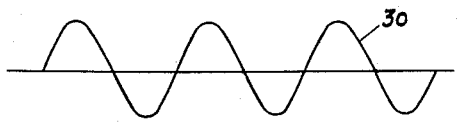
Fig. 6
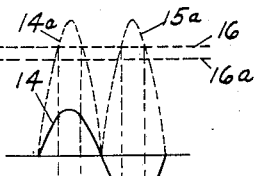
Fig. 3
Fig. 4
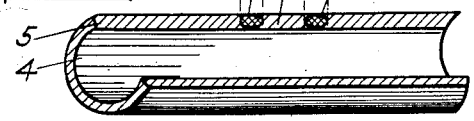
Fig. 5
Fig. 7
INVENTOR.
BY  Julius E. Foster
ATTORNEY.

April 14, 1959   J. E. FOSTER   2,882,384
WELDING SYSTEM
Filed Dec. 23, 1953   8 Sheets-Sheet 2
Fig. 8
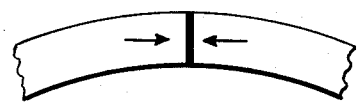
Fig. 9
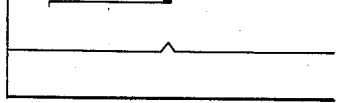
Fig. 10
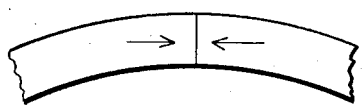
Fig. 11
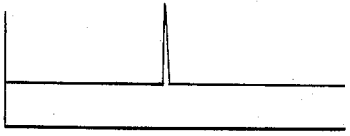
Fig. 12
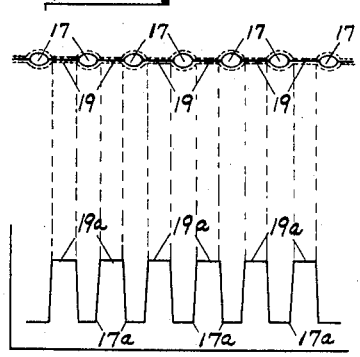
Fig. 13
Fig. 14
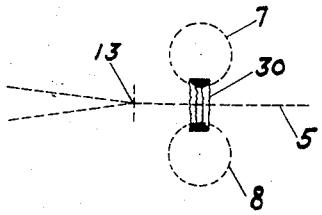
Fig. 15
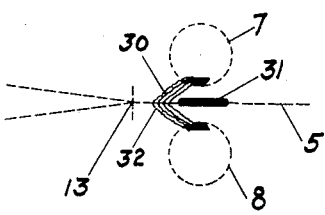
Fig. 16
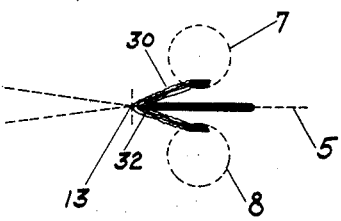
INVENTOR.
BY Julius E. Foster
ATTORNEY.

April 14, 1959  J. E. FOSTER  2,882,384
WELDING SYSTEM
Filed Dec. 23, 1953
8 Sheets-Sheet 3
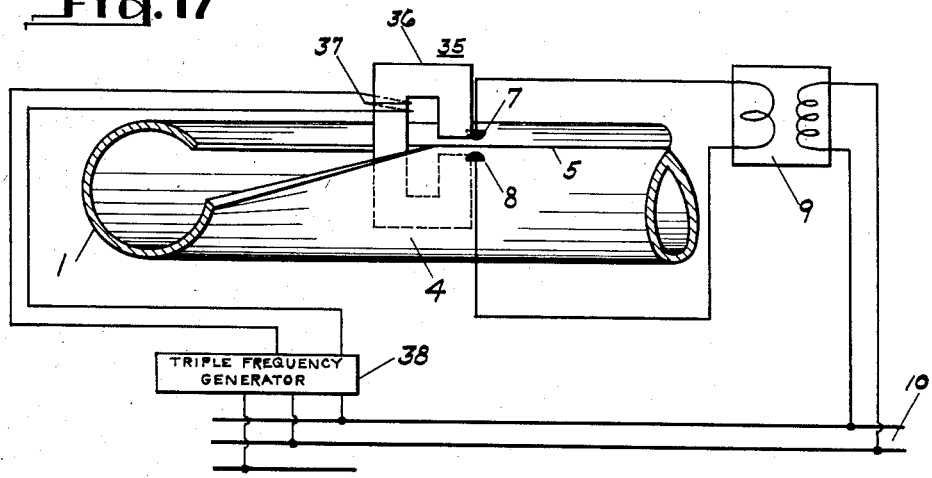
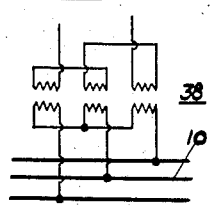
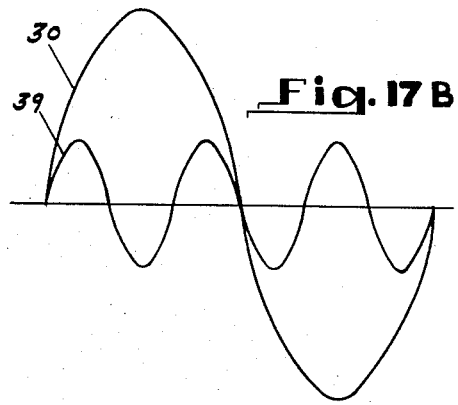
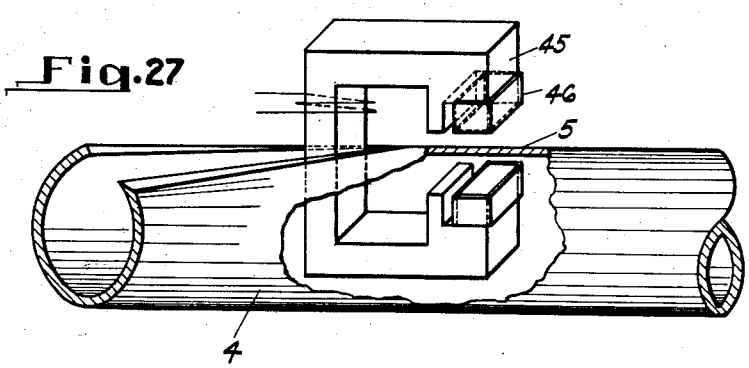
INVENTOR.
BY *Julius E. Foster*
ATTORNEY.

April 14, 1959     J. E. FOSTER     2,882,384
WELDING SYSTEM
Filed Dec. 23, 1953     8 Sheets-Sheet 4
Fig.18    Fig.19    Fig.20    Fig.21
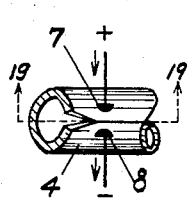
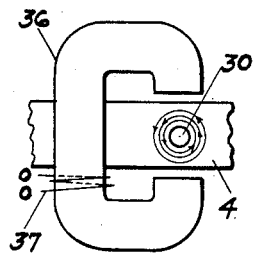
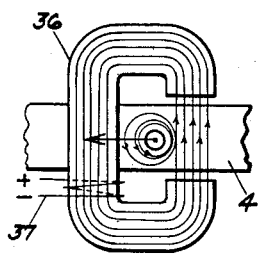
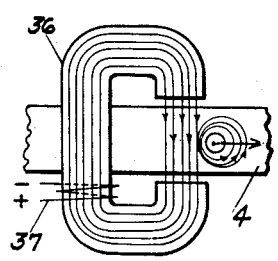
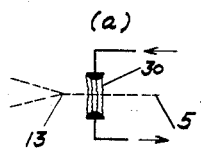
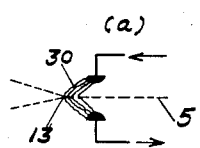
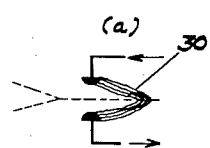
Fig.22    Fig.23    Fig.24    Fig.25
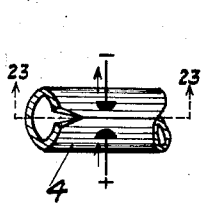
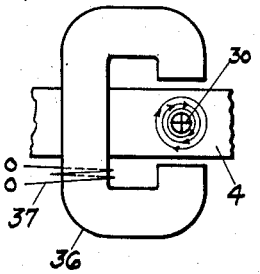
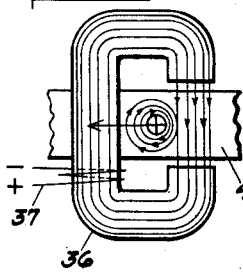
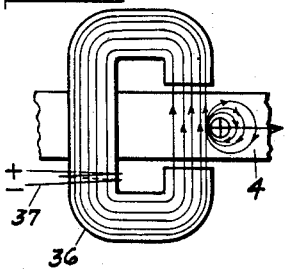
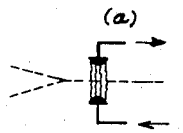
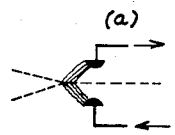
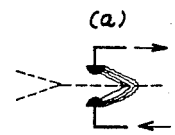
Fig.26
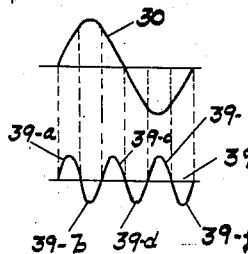
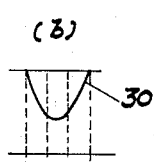
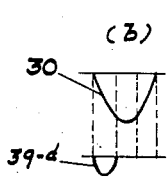
INVENTOR.
BY Julius E. Foster
ATTORNEY.

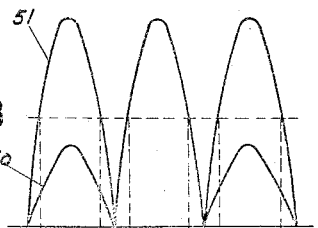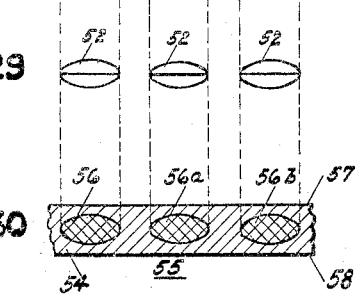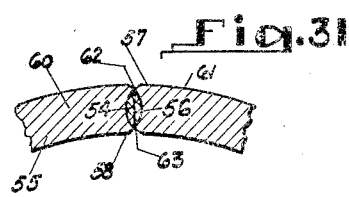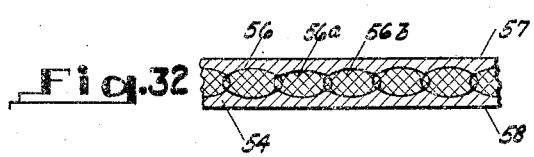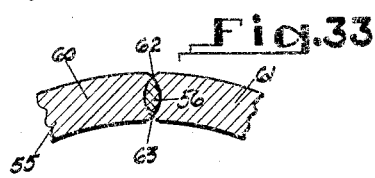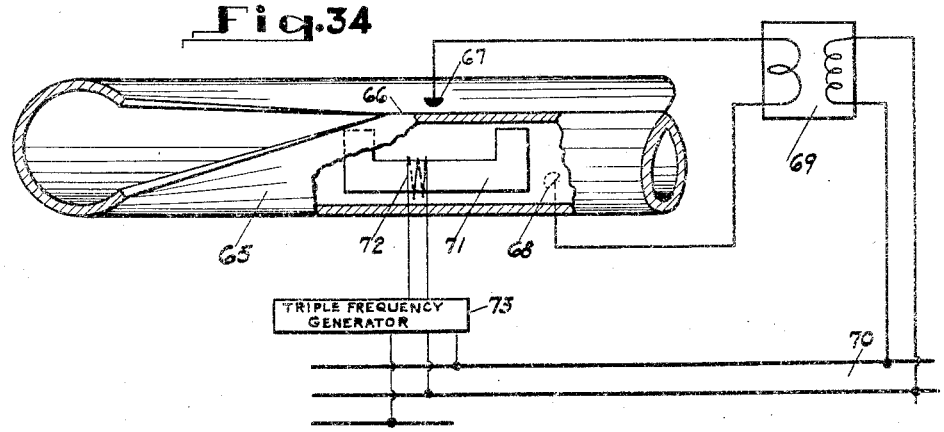

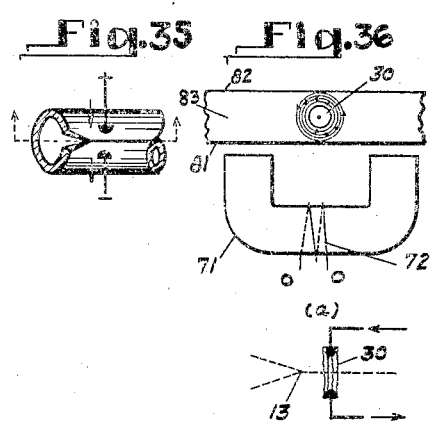
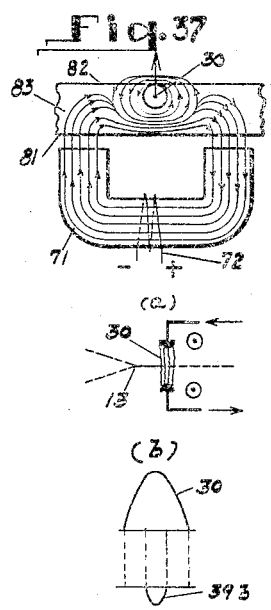
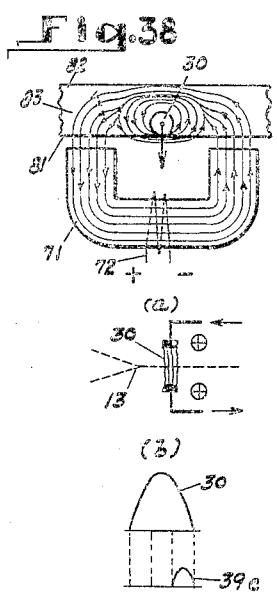
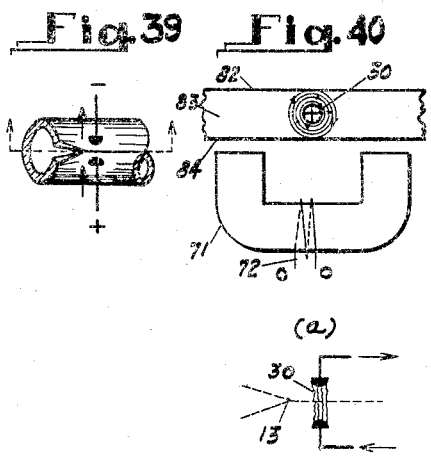
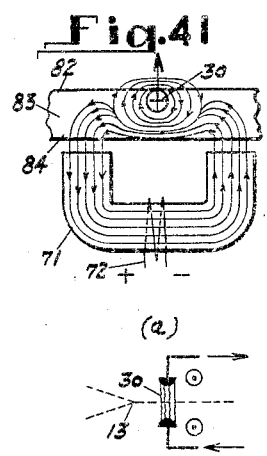
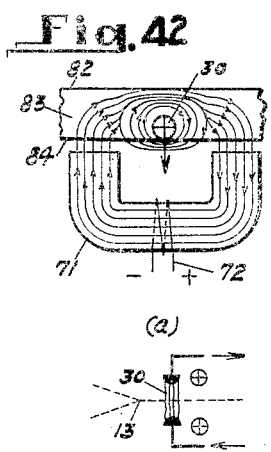

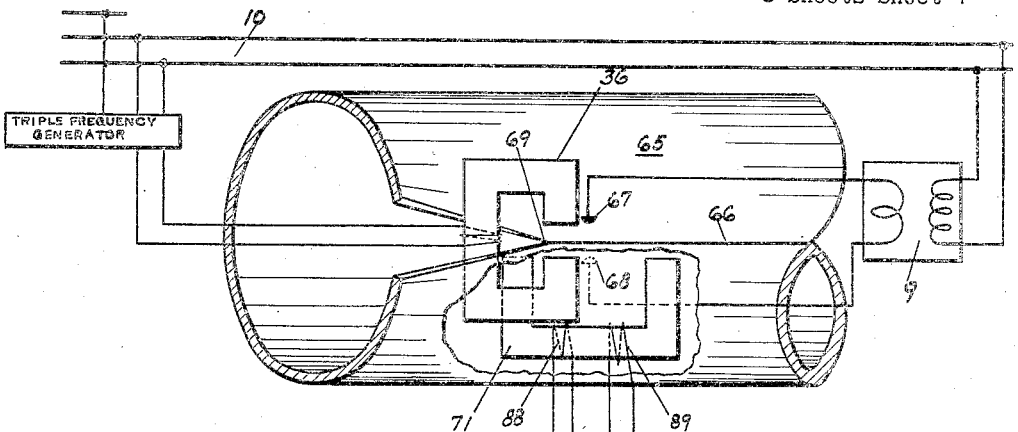
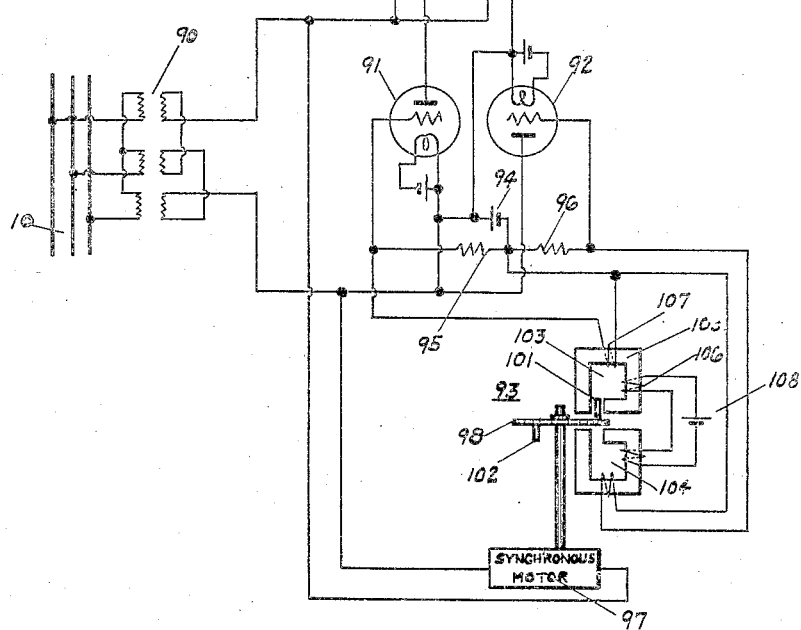
Fig. 43
Fig. 43A

April 14, 1959    J. E. FOSTER    2,882,384
WELDING SYSTEM
Filed Dec. 23, 1953    8 Sheets-Sheet 8
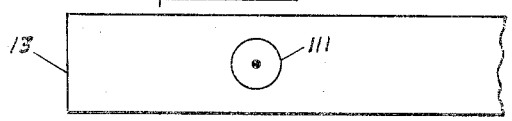
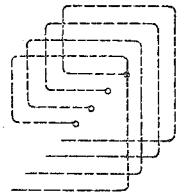
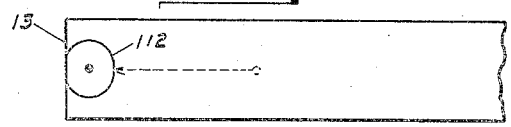
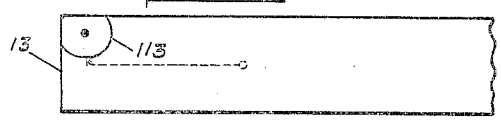
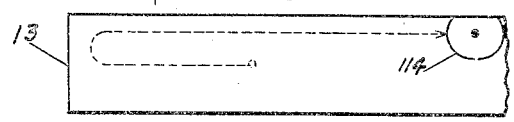
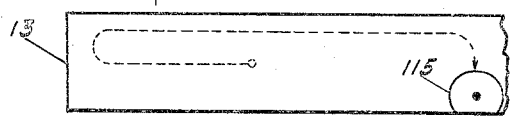
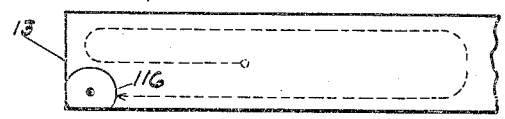
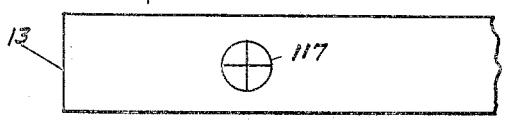
INVENTOR.
BY *Julius E. Foster*
ATTORNEY.

United States Patent Office 2,882,384
Patented Apr. 14, 1959

2,882,384

WELDING SYSTEM

Julius E. Foster, Jackson Heights, N.Y.

Application December 23, 1953, Serial No. 399,942

23 Claims. (Cl. 219—67)

This invention relates to electric welding, and particularly to a process of welding control that is generally applicable to various welding operations.

Electric resistance welding consists generally in placing two metal elements together in surface-to-surface relation where the weld is to be established between those surfaces, and in then applying the welding current to the two elements in such manner that the current will pass between the contacting surfaces and establish sufficient heat at those surfaces to effect a weld at and between those surfaces.

Theoretically, direct current would seem to provide the most satisfactory medium for welding because of the steady continuous heating condition that it would establish. It is used to some extent, but, because of the difficulty in controlling the energy of large quantities of direct current, such as are necessary for electric resistance welding, alternating current energy is preferred, since it may be transformed and therefore more easily controlled. The alternating current energy may be generated at high voltage and transmitted at low current value through relatively small conductors to the place of utilization, and there transformed to low voltage and large secondary current for direct application to the welding operation. The large secondary current can be easily varied, or controlled for starting and terminating the welding operation, by controlling the value of the primary current which is relatively small, or by controlling the primary circuit traversed by the small primary current.

Although alternating current has provided these advantages for practical welding operations, it has suffered from certain limitations, which it would be extremely desirable to remove.

For example, direct current establishes a steady uniform heating effect where the surfaces to be welded are progressively heated and welded. Alternating current, however, establishes spotty heating effects, due to the peak formation of the successive heating waves or impulses. An increase of the direct current, if necessary, would uniformly raise the level of the heating effect. An increase of alternating current, however, would raise the peak values of the heating waves and would establish localized excessive heating, with consequent burning out or melting out of the metal at the spots thus excessively heated.

Because of such spotty welding, with alternating current, the speed of a progressive welding operation must be kept low enough to permit the spot welds to overlap; otherwise the weld, though progressive, is discontinuous.

Increasing the current does not obviate the discontinuity, but merely aggravates the increased spot heating condition referred to above. Thus, with alternating current, the amount of energy that may be introduced into the weld zone according to previous practice, is limited.

Since the usual frequency generally available is 60 cycles, the number of current energy or heating impulses that may be obtained from that frequency is 7200 impulses per minute. While that may seem a large number of impulses, which should be generally adequate, it is nevertheless insufficient to permit the maximum speed of welding that would be otherwise possible, in the art of welding thin wall tubing, for example, if a continuous weld is desired.

While the use of a higher frequency might seem an obvious solution to that problem, in order to increase the number of current, and, therefore, heat impulses, it has been found that the reactance characteristics of the circuits develop sufficient impedance to limit the amount of energy that may be supplied to a welding circuit at higher frequencies than the standard commercial frequency of 60 cycles. The other immediately suggested solution of supplying more welding energy to the circuit at 60 cycles also does not solve the problem, for the simple reason that the application of greater currents merely causes the development of an excess amount of localized heat by each current wave, as previously mentioned, with a resulting burning out of the materials, which ruins rather than establishes a weld.

One of the major fields of application of the process of progressive resistance welding by alternating current has been in the formation of thin walled tubing from strip steel. That process is described in the Johnston Patent 1,388,434, issued August 23, 1921, for the formation of tubing having the general characteristics described in his divisional Patent No. 1,435,306, issued November 14, 1922.

One object of this invention is to provide a method of establishing a continuous progressive weld with alternating current.

Another object of this invention is to provide a method of welding with alternating current that will provide the advantages of equalized uniform heating conditions of direct current.

Another object of this invention is to provide a new process for establishing a progressive continuous weld with alternating current that will permit the welding operation to be performed at a relatively high speed without introducing discontinuities in the weld seam as has been the case heretofore.

Another object of this invention is to provide a welding process wherein and whereby a welding current from an alternating current source may be applied to heat a desired surface at a rate corresponding to a higher frequency than the fundamental frequency of the welding source.

Another object of this invention is to provide a method of welding that shall permit a welding operation to be performed at a higher rate of speed in proportion to the frequency of the applied welding current than has been heretofore possible.

Another object of this invention is to provide a novel process of controlling the welding current in such manner as to permit and to enable more current to be introduced into the weld zone, to develop more heat without burning out the welded metal.

Another object of this invention is to provide a process whereby a welding current stream may be applied to transverse a particular region of a surface to be welded, for a time interval less than the normal duration of the welding current wave, whereby a relatively large current may be applied to perform the welding operation in quick time.

Another object of this invention is to provide a method of welding that shall confine the heating effect of the welding current substantially to the seam surfaces to be welded, and thereby obviate the formation of weakened side zones along the seam.

Another object of this invention is to provide a method of welding that shall establish a fast welding and cooling action along the seam, and thereby obviate any substantial change in the metallurgical structure of the metal along the seam in response to the welding heat.

By controlling the welding current stream to establish a relatively fast welding and cooling action confined substantially to the surfaces to be welded at the seam, the cohering seam metal may be confined to a relatively thin layer, of fine grain structure, forming a strong bond at the seam.

Another object of this invention, therefore, is to provide a welding process that shall develop a thin weld seam having an extremely fine grain structure throughout the entire welded seam zone to serve as a strong metallurgical bond between the adjoining surfaces welded together.

Endeavors have been made to apply the same Johnston process to butt welding thick walled tubing or pipe, for use as oil country goods. Such pipe would range from ¼ to ⅜ of an inch, or more, in thickness. The butt welding of material of such dimensions presents a problem which was not satisfactorily solved by the Johnston process. For material of that thickness, the weld spot formed an oval spot with its minor axis not extending fully across the width of the edge surface at the seam, from the internal corner edge to the external corner edge of the seam surfaces. Even though the speed of movement of the thick-walled skelp, as a cylinder, through the welding machine, was sufficiently slow to permit the welded spots to overlap lengthwise, so that a substantially continuous weld might be made along the middle of the seam surfaces, there still remained, nevertheless, the unwelded areas between such welded middle sections, or core, of the seam and the inner and outer peripheral edges of butt welded seam surfaces. Such unwelded portions along the edges of the seam areas formed notches or V-like regions, or troughs, with lines along the inner and outer edges of the seam weld, which became stress concentration lines in service, when the finished pipe was subjected to pressure, during operation, or when the pipe became heated by external ambient conditions.

Those stress concentration lines caused defective or weakened zones which would open at the seams. In order to obviate such stress concentration lines the seam weld should be complete over the entire seam surface area.

Another object of my invention, therefore, is to provide a welding process that will insure a complete weld over the entire area of a surface to be welded, so that, for example, in the case of a butt weld, the weld shall be completed from edge to edge of the seam formed by the welding operation, so that no lines or regions of high stress concentration shall be formed along the inner or outer edges of the seam.

Another object of my invention is to provide a welding process that will permit the use of alternating current for butt welding tubes or pipe of relatively thick walls, with a weld that shall be continuous and uniform, and that shall extend transversely across and throughout the entire seam, from the inner edge to the outer edge to obviate the formation of unwelded groove lines, along the edges of the seam, that would act as stress concentration zones during service.

In the Johnston method, the permissible welding current, as a measure of the heat energy that can be introduced into the seam for welding, has to be correlated to the speed of movement of the tubing, through the machinery, and to the pressure upon the butted edges of the material in forming the seam. If that current value should be then exceeded, the heat generated at each weld spot would be sufficient to melt out, or "burn out," a sufficient amount of the metal from the welded seam to form a hole in the seam before the tubing could travel out of the heated weld zone to enable the seam metal to become sufficiently cool to resolidify. That characteristic of progressive resistance welding with alternating current, as heretofore practiced, where each current wave impulse establishes its spot weld, imposes the limitation upon the amount of current that may be supplied to the welding zone, and, therefore, the limitation in the amount of heating energy that may be supplied to the weld zone.

It is to overcome the limitations of such prior process, and to procure the resulting advantages, that this invention is directed.

This invention presents a new and fundamental principle of control in welding, which has general application in the field of resistance welding, whether for spot welding or for continuous progressive welding over a length of surface.

Generally, the major object of this invention is to provide a welding system in which the welding current is controlled and moved by an external electro-magnetic field in such manner as to cause the welding current to scan and to heat-weld the entire areas of the surfaces that are to be welded to each other.

In its most general aspect, this invention involves the application of an external electro-magnetic control flux field, which may be made up of one field or of more flux fields, to control the normal welding current stream to cause it to move along selected regions of the welding zone, in the nature of a scanning operation, with a relatively fast action, to establish a welding condition throughout and over the entire selected area that is to be welded. By reason of the quick incisive sweeping action of the welding current stream when so controlled, and its extremely rapid heating influence upon the surfaces to be welded, the actual value of the current, considered as a heat effect, may be largely increased over that value to which the current would have had to be limited in the prior Johnston process.

Thus, by reason of the fast action and the scanning or sweeping action of the current, the advantage achieved is to be able to introduce a much larger amount of heating energy into the weld zone without the danger of localized heat and burn-outs; the welding operation itself is effected much more rapidly so that the weld is made and completed before any metallurgical disturbance can take place that would permit any of the constituents of the metal to come out of solution and weaken the metal; and the welding result is established throughout the entire areas in the surfaces at which the weld is desired, so that no unwelded areas are left along the seam edge surfaces, where stress concentration zones would result; and the heating effect is confined substantially to the surfaces at the seam so that the weld metal, the metal in and forming the seam, constitutes a thin layer of strong fine grain metallic cement bonding both welded surfaces as a strong coherent structure.

In order to overcome the discontinuity in the seam, due to unwelded portions between the spot welds of thin wall tubing, as made by prior practice, this invention contemplates the disposition of means to establish an electro-magnetic flux field in the region of the welding current stream, adjacent the seam cleft, and thereby effect a magneto-motive action between such external flux field and the welding current stream to sweep or reciprocate the current stream back and forth through a space of pre-determined length in the seam, thereby to cause the welding current stream to establish a welding action longitudinally along the seam, instead of making the spaced spot welds as in the prior practice.

Such external controlled flux fields should preferably include an alternating flux field having a frequency greater than the frequency of the welding current where an alternating welding current is used. For example, if the welding current is a 60 cycle current, the control flux should preferably, for convenience, be a multiple of that frequency. By thus reciprocating the welding current along the seam, a much greater area of surface may be welded during each current wave or impulse, and a much greater amount of heating energy can be safely applied to the seam to establish the welding operation, due to the shorter length of time the welding current is permitted to traverse the surface being welded.

In the case of thick wall pipe, the same reciprocation of the welding current stream is established according to the principles of this invention. In addition, however, it is necessary to establish a weld in the outer and inner longitudinal edges of the seam, as well as between the weld spots along the seam surfaces. The external flux field should, therefore, be such as to establish both a reciprocating movement of the welding current stream longitudinally along the seam, and also to establish a force that will move the current stream outwardly in the seam towards the outer edge of the seam, and inwardly in the seam towards the inner edge of the seam during alternate reciprocations. For this application, this invention therefore contemplates the use of a flux field having two component effects, to force the welding current stream radially inward or radially outward, while at the same time reciprocating the welding current stream along the seam.

In the case of the thin wall butt-welded tubing, the external magnetic flux may be established to extend perpendicularly through the tubing in the region of the seam and to include the seam along a distance within which the welding current is to be controlled.

In the case of the thick wall butt-welded pipe, a flux field similar to that to be used with the thin wall tubing should be applied and an additional flux field that will mainly lie lengthwise within the seam in such manner as to make the pipe serve as an armature for the flux producing magnet. The two fluxes will then serve to establish the reciprocating action of the welding current and the radial shift of the welding current at the same time.

The manner in which this invention is applied to thin wall tubing and to thick wall pipe is illustrated in the accompanying drawings, in which:

Figure 1 is a schematic view illustrating the layout of a welding system for tubes made from strip metal.

Figure 2 is a partial schematic plan view of a tube welding system, illustrating the disposition of the current supplying electrodes adjacent the seam cleft, and the side-pressure rolls behind the electrode rolls.

Figure 3 is a graph of one cycle of an alternating weld current sine wave.

Figure 4 is a plan view of the seam, and Figure 5 is a vertical sectional view along the seam, with both views related to the current wave cycle of Figure 3, when the welding is done at a high rate of speed, sufficiently fast to separate the successive weld spots in the seam.

Figure 6 is a graph of a sine wave representing the weld current.

Figure 7 is a view of a seam surface similar to that in Figure 5, with the welding done at a speed sufficiently low to permit the welded spots to overlap, to establish a continuous weld along the seam.

Figures 8 and 9 illustrate the relationship between high pressure at the seam surfaces and the resultant heating effect in the seam, between the surfaces.

Figures 10 and 11 illustrate the relationship between low pressure at the seam surfaces and the resultant heating effect between the surfaces.

Figure 12 is a schematic illustration of a group of spaced welded spots along a seam, and Figure 13 is a graph illustrating the resistance distribution, along the seam, with relation to the spaced welded spots of Figure 12.

Figure 14 is a schematic view of a welding current stream between the electrodes at the beginning of a current wave impulse.

Figure 15 is a similar view showing the distribution of the current stream with respect to a heated seam zone after the beginning of the impulse.

Figure 16 is a similar view illustrating the disposition of the current stream when shifted to its extreme left at the cleft, or initial point of contact between the seam edges.

Figure 17 is a schematic diagram of a welding system modified according to one phase of this invention, to establish reciprocating length-wise shifting of the welding current stream along the seam.

Figure 17-A is a simple diagram of a transformer arrangement whereby a triple-frequency single-phase current may be derived from a three-phase circuit, for use in the system of Figure 17; and Figure 17-B is a graph illustrating the relationship between the single-phase fundamental or base frequency welding current and the triple-frequency control current of Figure 17.

Figures 18 to 21, inclusive, are schematic views illustrating the relationship between the welding current stream through a seam surface, and the control magnetic flux set up by the control current, with the progressive actions effected by the change of polarity of the control current during the positive wave of the welding current of the system of Figure 17.

Figures 22 to 25, inclusive, are similar views showing the progressive relationship between the welding current stream and the control flux set up by the control current, during the negative wave of the welding current.

Figure 26 is a simple graph of one cycle of the welding current, and the three related in-phase cycles of the triple-frequency control current, in the system of Figure 17.

Figure 27 is a simple schematic view illustrating the provision of a shaded pole on the control magnet to provide a travelling flux field.

Figure 28 is a simple graph showing the relationship between the alternating current and the heating impulses.

Figure 29 is a graph related to Figure 28 to illustrate the relative disposition of heated regions along a welded seam.

Figure 30 is a schematic sectional view taken longitudinally along a welded seam and showing the disposition of welded spots in a thick-wall pipe, made at a speed sufficiently high to space the welded spots from each other.

Figure 31 is a transverse sectional view across the seam illustrating how a central disposition of the weld zone fails to extend to both the inside and the outside peripheral edges.

Figure 32 is a view similar to Figure 30, but showing the disposition of the weld spots in overlapping relation when the welding action is performed at slow speed.

Figure 33 is a transverse sectional view across the weld seam on a pipe welded as in Figure 32, illustrating a failure, similar to Figure 31, to reach to both the inside and the outside peripheral edges.

Figure 34 is a schematic diagram of a welding system modified according to this invention, to establish radial reciprocation of the welding current stream.

Figures 35 to 38, inclusive, are schematic views illustrating the progressive effects of the control flux set up by the control current upon the welding current stream during the positive wave of the welding current, in the system of Figure 34.

Figures 39 to 42, inclusive, are similar progressive views illustrating the effect of the control current magnetic flux upon the welding current stream during the negative wave of the welding current, in the system of Figure 34.

Figure 43 is a simple diagram of a welding system, embodying this invention, with a magnet for longitudinally reciprocating the weld current stream, and a magnet for radially controlling the weld current stream, with means for selectively energizing the radial control magnet with selected control impulses.

Figures 44 to 50, inclusive, are progressive views showing the step-by-step movements of the weld current stream in scanning a seam surface according to the control imposed in the system shown in Figure 43.

Figure 51 is a schematic perspective view of the progressive overlapping paths of the welding current stream of Figures 44 to 49, inclusive, shown in exploded or opened position, as a group of progressive helices.

As illustrated in Figure 1, a system for forming tubes from strip material, by shaping the strip into cylindrical form and then welding the strip edges along the seam thus formed, comprises generally suitable mechanism for supplying strip material 1 from a reel 2 to a forming machine 3, to form the strip into a cylinder 4 with the outer edges contacting along a seam 5, which is guided by a suitable guiding finger 6 to guide the cylinder 4 between two electrodes 7 and 8, to permit a welding current derived from a welding transformer 9 to be supplied to the cylindrical tube 4 across the seam 5 to generate sufficient heat in the seam to effect a welding between the engaging seam edges. The seam edges are held in close contact by two pressure rollers 11 and 12 to hold the welded edges together until the heated metal of the seam can cool and solidify to hold the tube closed, after passing out of the weld zone between the electrodes.

As shown in Figure 2, the strip 1, when formed into a cylinder, makes the first contact between the side edge surfaces at a point that constitutes a cleft 13, intermediate the guide finger 6 and the plane through the electrodes. The guide finger is preferably of the nature of a file to clean the edge surfaces of the strip by removing any rust or dirt adhering to those surfaces.

In Figures 3, 4, and 5, is illustrated, generally, a relationship between the two waves 14 and 15 of a weld current cycle and the weld spots produced thereby. The current waves 14 and 15 are of opposite polarity, but their heat effects represented by wave impulses 14–a and 15–a have no polarity characteristics.

The effective value of a sine wave is approximately seven-tenths of the maximum peak value. The heat effect is therefore represented by a value below the peak value, and, for satisfactory welding operation, the heating effect or heating value of an alternating current should be sufficient to melt the metal in a thin layer on the edge surfaces to form a weld seam between those surfaces.

As schematically shown in Figure 3, the heat impulses 14–a and 15–a have effective heating values measured by the height of dot and dash line 16 above the zero or base line. Broken line 16–a schematically represents the amount of heat necessary to establish a melting of the seam edge surfaces for the welding action.

If the heating effect of the heat impulses 14–a and 15–a reaches the value represented by line 16–a, a spot of metal will be effected at the seam, on both surfaces, and will form a weld spot 17 in the seam, as in Figure 5, which will look like the tapered spot shown in Figure 4. Relatively the formation and the location of the weld spots 17 will be governed by the time and place occurrence when the heat impulses establish the effective heat values that are at least equal to the melt values represented by line 16–a.

If the metal tube is kept stationary, the heat impulses will pile up on one spot at the seam. If the tube is moved past the electrodes, while current flows between the electrodes, the locations of the spots will be controlled according to the times when the heat impulses reach their effective values. If the speed of movement of the tube is high, the weld spots 17 may be separated, as shown in Figures 4 and 5. The spaces 19 along the seam, between the weld spots 17, will be unwelded, and will open sufficiently, under excess internal pressure, to permit leakage through the seams at those points.

If the speed is slower, the current waves of the welding current, shown in Figure 6, will establish closely disposed weld spots 17, as in Figure 7, that will overlap sufficiently to establish a continuous weld along the seam.

In resistance welding, the pressure between the edge surfaces at the seam is an important factor in controlling the heat development in the seam.

The amount of heat that is generated in the weld, directly at the contacting edge surfaces, can be controlled by varying the pressure between the contacting seam edges. The reason therefor becomes clear upon consideration of Ohm's law. The energy at the weld is the product of the weld current I and the voltage drop E, or $IE$. The voltage drop E, in turn, is the product of the current I and the resistance R, between the edges at the seam, or $IR$. The energy is therefore represented by the well-known expression $I^2R$. The heat developed in the seam is therefore proportional to the resistance of the contact between the seam edges.

If the contact pressure between the edges at the seam is high, the resistance will be low, and the amount of heat generated in the seam will be small. Conversely, if the contact pressure is low between the edges at the seam, the resistance will be high and the amount of heat developed in the seam will be large. Thus, the heat in the weld can be inversely controlled by the pressure at the weld, for the same current value.

Therefore, where the pressure is high and the resistance low, as in Figure 8, the heat developed is low, as shown in Figure 9. And where the pressure is low, as in Figure 10, the resistance is high and the heat is high, as in Figure 11.

Thus, for the same value of weld current, the heating effect may be high or low, depending upon the contact pressure at the seam edges. If that pressure is kept constant, however, the heat effect will vary as the square of the current.

Where such pressure was maintained constant, as in the manner heretofore practiced, the amount of current that could be applied to the seam was limited to a quantity that would not generate sufficient heat at each weld spot to cause the metal to drop out.

The quantity of current that could be safely applied to the seam was also governed by the speed of movement of the tube through the weld zone and past the welding electrodes. A fast moving tube could safely receive more current in the seam than a slow moving tube, since the heating effect would be more distributed in the fast moving tube, and the tube would be cooled faster.

A particular advantage of high speed welding is that the change in the metallurgical structure of the metal at the seam edges is reduced to a minimum. Thus, in the welding of steel, even with a high carbon content, a high speed in the welding action permits only a small change in the carbon distribution, and does not appreciably withdraw the carbon from its solid solution in the metal, along the seam, as is permitted by slow welding, where sufficient time is available for extensive metallurgical redisposition in response to the generated heat impulse of the weld current.

That desirable feature of maintaining the original metallurgical structure is substantially achievable with high speed welding, and is one of the advantages achieved by this present system.

With welding current of standard commercial frequency of sixty cycles, the heating time, measured by the time of contact between the electrodes and the metal being welded, is relatively short. If that time could be diminished still further, while effecting a complete weld, however, there would be still less time for change of metallurgical structure in response to the welding heat impulses, and any such tendency would be arrested that much more quickly.

If the frequency of the welding current were increased, higher welding speed would appear theoretically possible. The reactance, or electrical impedance, of the system would be so increased, however, that the current value could not be sufficiently increased to provide a current impulse with sufficient heat generating content to effect a weld.

Similarly, with current of standard commercial frequency of sixty cycles, the successive weld spots 17 as formed in a progressive welding operation, are spaced from each other, as indicated in Figure 5. The metal zones 19 between those weld spots 17 along the two edges at the seam, are not welded together.

Here, again, it would appear that the use of a current of higher frequency would serve to locate the weld spots closer together, and, therefore, cause them to be overlapping and continuous, to establish a continuous progressive weld along the seam.

But the higher frequency current is unsatisfactory for that purpose due to the increased impedance of the system to higher frequencies, as already explained.

During a welding operation at high speed, with the weld spots spaced from each other, as shown in Figure 12, the resistance along the weld is distributed as shown in Figure 13. Where the seam is welded at the spots 17, the resistance across the seam is small, as indicated by the bases 17–a of the graph of Figure 13. At the spaces 19 between the weld spots 17, the resistance across the seam is high, as indicated by the peaks 19–a in Figure 13.

As each current impulse, whether positive or negative, crosses the seam 5, the metal at the seam edges becomes heated. The manner in which the heated metal along the seam controls the weld current is shown in Figures 14, 15, and 16.

As shown in Figure 14, a current impulse of weld current, represented by current streams, traverses the metal across the seam 5 as it passes between the two electrodes 7 and 8. The metal traversed by the current becomes heated and welded. While heated, its resistance is increased. So long as the heated metal, indicated by the dark section 31 (exaggerated for clearness) lies in the path between the electrodes 7 and 8, the current impulse, whether it is the one that heated that metal, or whether it is the impulse following the heating impulse, will shift to the left, to the cold metal of the seam, adjacent and behind the heated metal, as shown in Figure 15.

As soon as the current stream 30 between the two electrodes is diverted from a direct straight-line path between the two electrodes 7 and 8, the electro-magnetic flux of the current stream itself acts upon the stream as a movable conductor and moves the V-point 32 of the current stream to the extreme possible left-hand position along the seam, to the place where the seam edges are initially engaged at the cleft 13, as indicated in Figure 16.

As the metal is progressively moved along between the electrodes, each current impulse is similarly moved to the cleft at the engaging seam edges, where the resistance between engaging edges of the seam is highest. The heating effect is therefore maximum at the cleft according to Ohm's law, as previously explained. It is this action which is utilized to advantage in this system of progressive resistance welding. The increased heating action at the cleft, due to the high resistance at that point, heats the contacting metal of the two edges at the seam to a temperature that melts the layers of metal on both contacting edges so the molten metal may coalesce to form the weld between the two engaging edges. As the metal of the seam proceeds on its way, the heat of the seam edges is transmitted back into the body of the adjacent metal and dissipated, and the seam is rapidly cooled, and the coalesced weld spot solidified. The pressure rolls 11 and 12, shown in Figure 1, serve to hold the seam edges together long enough to permit the weld spot to solidify. To the extent that the heated tube may be expanded to a diameter somewhat slightly larger than the initial diameter, the pressure rolls maintain an increased reaction pressure on the seam of the tube being welded. The pressure rolls are adjustable, however, so the pressure may be varied under different welding conditions to establish optimum operation.

For many applications, where a tube is used for structural purposes, it is satisfactory to provide a tube whose seam is held closed, even though the weld spots are spaced as in Figures 5 and 12, and even though the seam is not continuously welded along its length.

For other applications, where the tube will be subjected to internal pressures, as in grease guns, for example, or where the tube is to serve as a conduit, the seam should be completely welded along its length. With welding methods heretofore available, such a continuous weld could be effected only by a slow welding operation, so that successive heat impulses would overlap. Such slower welding operation would produce less tubing per unit of time, and would not utilize the maximum capacity of the welding machine. Moreover, the slower welding operation retains the heated metal of the seam in the weld zone long enough to permit the original metallurgical structure of the metal at and along the seam to be modified by the heat of welding, and to segregate the elements of the metal from their normal proper disposition. The welding heat would not be dissipated quickly, at such slow speed, but would be transmitted to the metal in the side zones adjoining the seam and would heat that metal to a sufficient degree of softening to cause weakening of the metal along such side zones.

Thus, for a continuous seam weld, the welding operation of the prior art must be slow enough to permit weld spot overlapping, with the attendant disadvantages of overheating along the seam and of undesired metallurgical modification.

Higher speed of welding operation of the prior art results in a discontinuous weld. The use of high frequency current for more frequent and, hence, closer weld spots is not possible. The use of greater current quantities is impossible, according to prior art practices, because each current impulse would generate more localized concentrated heat than necessary merely for the welding operation, and would melt out enough metal from the seam to leave a hole through the wall of the welded tube, at the seam.

The method of the present invention, as herein disclosed, overcomes the various difficulties of the prior art, outlined above, and permits a continuous weld to be made at high speed with welding current of standard commercial frequency. An incidental advantage is the rapid cooling of the welded surfaces, with a retention of the original metallurgical structure and a confining of the weld action to the edge surfaces only of the metal at the seam. In order to establish the continuous weld, more heat is necessary. By this method, such increased quantity of current is supplied to the weld zone without overheating and without burning out the metal at the seam.

One form of system operating in accordance with this invention is shown in Figure 17. In addition to the several elements employed in Figure 1, a system for electro-magnetically controlling the welding current stream is employed to cause the welding current stream to traverse and scan the contacting edge surfaces at the seam.

By controlling the welding current stream to cause it to scan the surfaces to be welded, the welding action is not limited, as in the prior art, solely to the spot heated by the peak of the current impulse, but, instead, the welding action is controlled and caused to take place over the entire surfaces of the contacting edges at the seam.

Moreover, by moving the welding current to scan the seam edge surfaces, the heating action of the weld current can be safely controlled both as to speed and current quantity. The fast traverse of the weld current stream on the seam edge surfaces shortens the time of heating and permits the use of a larger current quantity for welding, since the short heating time does not permit sufficient heat to accumulate to melt out the metal at the seam. The action is thus like the sweep of a hot welding brush between the two engaging edge surfaces, to melt the metal progressively along those edges so the molten metal may progressively coalesce and weld the seam edges together.

The method of operation, and the apparatus employed, may now be considered.

As shown in Figure 17, current from an alternating current supply circuit 10 is transformed by transformer 9 and supplied to the welding electrodes 7 and 8 to cross and heat the seam 5 of the tube 4 being formed. Normally, the current stream of each current impulse travels the space between the electrodes as shown and explained in Figures 14, 15, and 16, to form a weld spot at the time of the peak of the current impulse as indicated by the related Figures 3, 4, and 5.

In order to cause the current impulses to also heat the spaces 19 between the weld spots 17, means is provided, illustrated, by way of example, simply as an electromagnet 35, to establish an electromagnetic control flux field to act upon the weld current stream as a movable conductor, and to move the weld current stream as a movable conductor through a predetermined path.

The magnet 35 and the welding current stream act as an electric motor, the magnet being stationary and the current stream being movable. The direction of movement of the weld current stream depends upon the relation between the flux polarity and the current polarity; and the speed of reversal of movement depends upon the frequency of alternation of the control flux.

The magnet 35 is illustrated as embodying a single magnet structure 36 and energizing means shown as a single coil 37. Energy for the coil 37 may be derived from any suitable source having a frequency that is preferably a multiple of the weld current frequency. By way of illustration, a triple-frequency generator 38 is shown, consisting of a three-phase star-delta transformer with the secondary delta open at one vertex, as in Figure 17–A, to provide a single-phase circuit connection for the magnet winding 37. With such a connection, the third harmonic of the fundamental frequency is derived at the open vertex of the secondary delta to provide the triple-frequency control current 39. The control-frequency generator should preferably be energized from the same source which supplies the welding energy, so the control frequency can be synchronized with the fundamental weld current frequency, as in Figure 17–B.

Another suitable frequency generator, or frequency changer, may be employed, that will provide the frequency desired to control the weld current. It is merely necessary to synchronize the control frequency with the weld current frequency, as in Figure 17–B, for optimum operating conditions.

The manner in which the higher frequency control flux controls the position of the weld current stream, to shift the weld current stream back and forth along the seam to scan and heat the engaging seam edges, is illustrated in Figures 18 to 26, inclusive.

Figure 18 illustrates the direction of the weld current in a downward direction between the electrodes, corresponding to the positive current wave in the weld current circuit.

Figure 19 represents a schematic vertical elevation of the seam along and in the direction of the lines 19—19 of Figure 18, with the control magnet 35 in position adjacent the electrode plane, and with the weld current stream 30 represented by the heavy solid line circle and the central arrow point, or dot, indicating a positive wave (Fig. 19–b) with current movement toward the observer. The control magnet 36 is unenergized, and the current stream 30 is in the plane of the electrodes.

When the electromagnet coil is energized, as in Figure 20, by a positive wave of control frequency current 39–a (Figure 20–b and Figure 26), the weld current stream 30 is forced to the left, Figure 20–a, to the cleft 13 of the seam 5, for substantially the duration of the control frequency positive wave 39–a of Figure 20–b.

During the next half cycle 39–b of the control frequency, when the magnet coil is energized by a negative control wave 39–b, as in Figure 21–b, while the weld current 30 is still positive, as in Figure 21 and Figure 21–b, the weld current stream 30 is shifted to the right, away from the seam cleft, for substantially the duration of the control frequency negative wave 39–b of Figure 21–b.

During the next half-cycle 39–c of the control frequency, the control current 39 is again positive, while the weld current 30 is still positive, as previously shown in Figure 20. The magnet control coil 37 is therefore energized by a positive impulse 39–c again, as in Figure 20 and Figure 26, and the weld current 30 is shifted back again to the left to the seam cleft 13.

Thus, during the positive half wave of the welding current, the polarity of the control circuit changes three times and shifts the welding current stream 30 back and forth to scan a substantial length of the seam edges. If the seam is being moved past the welding electrodes, during such conditions, the heating effect of the welding current stream will be distributed over the moving seam length, instead of being concentrated to form a weld spot in the moving seam, as in the prior art.

Moreover, the shifted welding current 30 traverses each small increment of area of the seam edges for a shorter interval of time than where the welding current is not shifted, as has been the case in the prior art. Consequently, a greater quantity of welding current may be employed to effect fast heating, since the heating action of the welding current is quickly terminated at any area, before sufficient heat can be localized and accumulated to burn out the metal of that area from the seam.

When the polarity of the welding current 30 reverses, the scanning action of the welding current continues in the same manner as already described, and is illustrated in Figures 22 to 25, inclusive.

In Figure 22, the welding current is in the reverse direction, that is, it is upward between the electrodes and across the seam. That current is indicated in Figure 23 by the solid line circle 30 containing the cross, and represents current flowing away from the observer. The magnet coil is not energized, so the weld current is shown centrally located in the plane of the electrodes, in Figure 23.

In Figure 24, the welding current continues negative, and the control magnet is now energized by a negative current impulse 39–d of Figure 24–b. Under such conditions, with both currents instantaneously of the same polarity, the welding current is shifted to the left to the seam cleft, Figures 24–a and 24–b.

In Figure 26, is shown the relationship between one cycle of the fundamental frequency of the welding current 30 and three cycles of the control current 39. It will be observed that the first wave of the control current is of the same polarity as the corresponding wave of the fundamental frequency.

In this specification describing the system, the welding current and the control currents are considered as being in phase, that is, that the zero points of both waves occur at the same time.

When the control current polarity again reverses to positive, as wave 39–e in Figure 26, the conditions become as shown in Figure 25, and the welding current is shifted to the right, since it still is of negative polarity, opposite to the polarity of the control current.

The weld current 30 continues negative, as shown in Figure 26, for the duration of another half-wave 39–f of control current, during which time the welding current 30 is again shifted back to the left to the seam cleft, in the manner already described as shown in Figure 24.

Thus, with triple-frequency control current, the welding current is shifted once in one direction and twice in the opposite direction. With double frequency control current, the weld current stream would be shifted only once in each direction to scan the butting seam edges; and with a control frequency four times the fundamental welding frequency, the welding current stream would be shifted twice in each direction. The appropriate control frequency may be employed, according to conditions encountered or desired.

Where the metal being welded is relatively thin, so the width of the edge presented at the seam will be relatively narrow, the weld current stream section will be of sufficient diameter to extend across the full width of the seam surface area and thereby effect a complete weld along the entire area of the surface at the seam from the inner to the outer peripheral corner edge of the seam surfaces.

Here illustrated is an application where the welded surfaces are butt welded. The same operation may be applied to lap welds where the area of the lapped surfaces is such that the weld current stream would be wide enough to cover the width of the area to be welded.

The point that must be observed is that the control magnetic flux must be perpendicular to the welding current stream, so that a dynamo-electric reaction may be established between the control flux and the welding current stream.

By the fast reciprocation of the weld current stream 30 over the seam surfaces, those surfaces are heated quickly and cooled quickly. The original metallurgical structure is thus substantially retained.

For optimum operation and results, the value of welding current supplied to the seam should be co-ordinated with the speed of movement of the tubing through the machine, the size of the material surface to be heated, the frequency of the control circuit, and the pressure between the surfaces to be welded.

The continuous weld thus formed will produce a thin seam layer of fine grain structure serving as a strong coherent metallic bonding material over the entire seam surfaces and strongly holding them together.

A modified form of the control magnet is shown in Figure 27, where the magnet 45 is provided to be merely illustrative of electromagnetic means for setting up a travelling magnet control flux field. The magnet 45 is shown provided with a shaded pole structure 46 to establish a secondary or auxiliary flux that co-operates with the main flux to establish the traveling flux condition.

*Thick-wall or wide-zone welding*

Where the material to be welded into a pipe is relatively thick, as, for example, more than one eighth of an inch thick, the current stream may not be sufficiently wide or sufficiently distributed, over the width of the surface to be welded, to assure a complete weld from the inner to the outer edge of each surface at the seam.

In a thick-wall pipe, the prior art method of welding has produced results and conditions schematically illustrated in Figures 28 to 33, inclusive.

Figure 28 shows the welding current represented by the solid-line sine wave 50, and the corresponding heating impulse effects represented by the waves 51, all above the zero base line.

Figure 29 illustrates schematically the relation of several weld spot zones 52 to the heat impulse waves 51 and the current sine waves, under conditions which would separate and space the weld spots.

Figure 30 illustrates schematically an elevational view along a seam edge surface 54 of a thick-wall pipe 55, showing the disposition of a series of weld spots 56, 56-a and 56-b, as developed by a series of heat impulse waves 51, as in Figure 28. The weld spots 56, 56-a and 56-b are located intermediate the upper and the lower edges 57 and 58 of the seam surface 54, and are shown separated and spaced as they would be if the pipe were moved at a high speed past the welding electrodes used for that pipe. At a slower speed, the weld spots would be closer together or would even overlap lengthwise, depending upon the speed.

A transverse view of the seam region, taken through a weld spot 56 along the seam, is shown in Figure 31, where two portions 60 and 61 of the pipe are joined at the seam by a weld spot 56 that does not extend vertically through the entire height of the seam. Consequently, two V-shaped notches 62 and 63 are formed lengthwise along the top and bottom edges of the weld spots in the seam, at the inner and the outer edges of the seam.

The top and bottom edges of the weld spots, that constitute the apices of the notches, thus become stress concentration lines that tend to rupture the welds and to open up the seam. This situation obtains whether the weld spots are separated from each other due to high speed welding, as shown in Figure 30, or whether the weld spots overlap, due to slower welding, as shown in Figure 32. In the latter case the seam edge surfaces are still not completely welded, but have the V-shaped notches along the inner and the outer edges of the seam, as shown in Figure 33, which indicates a structure similar to that of Fig. 31.

Such V-shaped formations along the edges of a seam therefore constitute dangerous and destructive formations that tend to weaken and rupture a seam with an effective force that is entirely out of proportion to the relationship between the unwelded areas of the seam and the welded spot areas.

To eliminate this weakening influence, the seam surfaces must be welded over their entire areas from top to bottom edges of the seam. To accomplish and to assure such a complete weld, the welding current must be controlled to scan the entire edge surfaces at the seam, so the weld will be established over the entire surfaces. Such a scanning operation must involve, in part, a radial movement of the current stream, from a position across the upper edge of the seam to a position across the lower edge of the seam, in order to heat every part of the edge surfaces at the seam.

The radial part of the movement of the welding current stream is controlled by a system whose principles are shown in simple schematic form in the diagram of Figure 34. As shown, pipe 65 is to be welded along its seam 66 by a current stream between the two electrodes 67 and 68, connected to the secondary winding of a transformer 69 energized from an alternating current circuit 70 of standard commercial frequency, such as sixty cycles. An electromagnet 71 is disposed longitudinally along and adjacent the seam 66 to establish a control magnetic flux field in, and parallel to, the seam 66, to be perpendicular to the normal weld current path between the electrodes. By energizing the electromagnet 71 in one direction or the other, the weld current can be controlled to shift its position radially, from the inner peripheral edge of the seam to the outer peripheral edge of the seam.

The action of the electromagnet 71, in Figure 34, is similar to the action of the electromagnet 36 in Figure 17, insofar as the magnet flux reacts upon and moves the weld current stream. The disposition of the control flux is shifted ninety degrees, however, so the resultant movement of the current stream will be up and down in the seam, whereas in the system of Figure 17 the weld current stream was moved back and forth longitudinally.

The magnet 71 is energized by a coil 72 which is connected to be energized from a multiple frequency generator 73, which, for example, may be a triple-frequency source similar to the source 38 in Figure 17.

The manner in which the magnet 71 controls the position of the weld current stream is illustrated in Figures 35 to 42, inclusive.

Figure 35 illustrates the direction of the weld current in a downward direction between the electrodes, corresponding to the positive current wave in the weld current circuit.

Figure 36 represents a schematic longitudinal and vertical elevation of the seam along and in the direction of the lines 36—36 of Figure 35, with the control magnet 71 adjacent and spanning the electrode plane, and with the weld current represented by the heavy solid line circle 30 and its central dot representing an arrow point, indicating a positive current wave flowing toward the observer. The control magnet 71 is unenergized, and the current stream 30 is in the plane of the electrodes.

For the system of control described by way of example in this case, the first control wave of each three-wave group associated with each fundamental welding current wave, of each polarity, is not supplied to the control magnet. Only the second and the third control frequency waves are supplied to the magnet.

When the electromagnet 71 is energized, as in Figure 37, by a negative wave of control frequency current, while the weld current is positive, the weld current stream 30 is moved upward in the body of the pipe to the upper edge or corner 82 of the seam surface 83 that is to be welded to form the seam. Figure 37 illustrates how the magnet flux reacts upon the flux surrounding the weld current stream 30 to establish a motor force tending to move the current stream 30, as a movable conductor, away from the flux field set up by the magnet 71.

When the magnet flux field is reversed, by a positive control current impulse as in Figure 38–b, while the weld current is still positive as in Figure 38, the reaction between the magnet flux and the weld current flux is reversed from that in Figure 37 and the weld current stream 30 is forced downward to the lower edge 84 of the surface 83.

When the polarity of the welding current reverses, as in Figure 39, the direction of the flux field around the weld current stream reverses, as in Figure 40, where the circle 30 represents a negative weld current flowing away from the observer.

The reactions between the weld current flux and the flux field established by the electromagnet 71, as shown in Figures 41 and 42 are similar to the reactions shown in Figures 37 and 38, the reactions being such as to move the weld current stream in one direction or the other, to the corresponding edge of the surface to be welded to form the seam.

Thus, with electromagnetic means, generally represented by the electromagnet 71 of Figure 34, the weld current stream may be shifted radially from edge to edge through the surfaces to be welded to form the seam. Similarly, by electromagnetic means, generally represented by the electromagnet of Figure 17, the weld current stream may be shifted or reciprocated, longitudinally along the surfaces to be welded to form the seam.

In a thin-wall tube, the longitudinal reciprocation may be sufficient for a satisfactory weld if the weld stream forms a weld spot or area wide enough to extend between both corner edges of the seam surfaces to be welded as a butt weld. Similarly, a lap weld of thin material may be formed, where the width of the area of overlap is within the width of the weld spot or area that would be formed by the weld current stream as it is reciprocated.

In the case of a lap weld, the magnet position would have to be changed, of course, so the magnet flux would be perpendicular to the weld current stream, to establish the proper magneto-motive action.

In the case of a butt-weld between thick-wall edge surfaces of a pipe, where the width of the weld spot formed by the weld current stream is not co-extensive with the thickness of the wall or the width of the butt edge surface to be welded, the current stream should be moved to scan the entire surface area to establish a welding action over the entire area of the butt edge surface to be welded. To accomplish such scanning action, suitable electromagnetic means are provided to establish two-dimensional movements of the current stream in order to heat the entire butt edge surface area from inner corner edge to outer corner edge.

To effect movement of the weld current stream in two-dimension directions to cover an area, electromagnetic means, generally indicated by both magnets 36 and 71, are provided to establish proper co-operating magnetic flux fields to move the weld current stream in a predetermined path that will cause the weld current to traverse and heat the entire area presented to be welded, from inner to outer edge corners, and obviate the formation of V-shaped grooves with stress-concentration lines.

Such a system is indicated simply and schematically in the diagram of Figure 43. Energy from the alternating current circuit 10 is transformed by the transformer 9 and delivered to the electrodes 67 and 68 to be applied to the pipe 65 across the seam 66. The edges of the plate or skelp which is formed into the cylinder to be welded into a pipe, are engaged to form the cleft 69, the point of initial engagement to form the seam 66. The two electromagnets 36 and 71 are located adjacent the region of the seam extending from the cleft point to a short distance away from the cleft along the formed seam.

In order to scan and heat the entire edge surfaces at the seam, each weld current impulse should traverse the middle or central region and the top and bottom edge border regions of the seam surfaces to be welded. It will therefore be appreciated, upon reference to Figures 36, 37, and 38, that the weld current stream 30 should be reciprocated longitudinally along the seam surface 83 while the weld current stream is relatively in each zone shown in those three figures, so that the entire areas of the seam surfaces 83 will be heated and welded.

The weld current stream in the system of Figure 43 is therefore controlled, for example, so that while the weld current stream 30 is positive, as in Figures 19, 20, 21, 35, 36, 37 and 38, magnet 36 will be energized by the first positive control frequency wave to shift the weld current stream to the left, as in Figure 20, but the magnet 71 will remain unenergized so the weld stream 30 will move and remain substantially centrally located along the middle longitudinal zone of the seam surface 83, as in Figure 36, due to the balancing and centralizing effect of the flux around the weld current stream when no control flux is present from the magnet 71 to affect the position of the weld current stream 30 up or down vertically.

Thus, during the time of the first positive impulse 39–a of the control frequency current of Figure 26, while the weld current is positive, magnet 36 is energized as in Figure 20, and magnet 71 is unenergized as in Figure 36.

During the next time interval, represented by the negative impulse 39–b of the control frequency current, while the weld current is still positive, magnet 36 is energized as in Figure 21 and magnet 71 is energized as in Figure 37. Under those conditions the weld current stream is forced to the upper zone along edge 82 of the seam surface 83, and is moved to the right to traverse and heat that upper zone along the seam surface 83 for the distance controlled by the control magnets.

When the control frequency current changes polarity again to positive impulse 39–c, while the weld current is still positive, as in Figure 26, magnet 36 becomes energized as in Figure 20 again, and magnet 71 is energized as in Figure 38. Under those conditions the weld current stream 30 is forced to the lower zone along lower edge 84 of the seam surface 83, and is moved to the left to traverse and heat that lower zone along the distance controlled by the control magnets, back to the seam cleft.

When the weld current polarity changes to negative, as in Figure 26, the three impulses of the control frequency are made to control the movement of the weld current stream in the same manner as was described during the positive welding current wave.

During the first negative control frequency impulse 39–d, while the weld current is negative, magnet 36 is energized as in Figure 24, but magnet 71 is not energized, as shown in Figure 40. The weld current stream 30 is moved to the left to the cleft. Since magnet 71 is not energized the weld current stream is maintained along the middle zone of the seam surface 83.

When the control frequency current changes polarity to positive 39–e, being then the second impulse, while the weld current is negative, magnet 36 is energized as in Figure 25 and magnet 71 is energized as in Figure 41. Under those conditions the weld current stream is forced to the upper zone along edge 88 of the seam surface 83, and is moved to traverse and heat that upper zone along the seam surface 83 for the distance controlled by the control magnets.

While the weld current is still negative, and the control frequency polarity changes back to negative, the third control impulse 39–f, as shown in Figure 26, magnet 36 is energized as in Figure 24 and magnet 71 is energized as in Figure 42. Under those conditions the weld current stream is forced to the lower zone along edge 84 of the seam surface 83, and is moved to the left to the cleft, thereby heating and welding the seam surfaces along the lower zones or corners.

Thus, during each welding current wave of each polarity, the weld current stream is first moved along the central zones of the seam surfaces to the cleft for the duration of the first control frequency impulse; then raised to the upper edge and moved to the right for the duration of the second control frequency impulse; and is then depressed to the lower edges of the seam surfaces and moved back to the left to the cleft for the duration of the third control frequency impulse.

The above sequence of operations continues for each cycle of weld current voltage, and assures, by such scanning action, a complete heating and welding of the edge surfaces presented to form the seam. By the action of forcing the weld current stream upward toward and against the upper corner edges, the formation of an unwelded V-shaped groove along the edges is prevented.

The V-shaped groove, initially formed by the weld current stream moving along the middle of the seam surfaces, is in effect a cleft running longitudinally along the seam, and constitutes a region of high resistance that is conducive to the development of a large amount of heat to assure a complete effective weld along the edge of the seam, and thereby obviate any V-shaped groove to constitute a line of high stress concentration.

Similarly, the V-shaped groove is prevented at the lower edge of the seam, so the entire seam surfaces are entirely welded from edge to edge.

In order to control the energization of the control magnets 36 and 71 of the system in Figure 43, to establish the sequence of control operations as outlined above, the electro-magnet 36 may be connected to be energized continuously by the triple-frequency control current, since the three control impulses will move the weld current stream of each current wave of each polarity in a complete sequence in a path, insuring a complete welding action between the seam surfaces.

In the case of the magnet 71, however, the first of the three control impulses, for each current wave of each polarity, is not used, in the system herein described. The second control impulse is used to drive the weld current stream to the upper edge; and the third control impulse is used to drive the weld current stream to the lower edge.

In order to establish such selective action in supplying only the second and the third control impulses to magnet 71, a system such as shown in Figure 43, or its equivalent, may be employed.

Two coils 88 and 89 are provided to energize magnet 71, and are arranged to be reversely effective. A source 90 of triple welding frequency is connected to the coils 88 and 89 through two grid-controlled gas-filled rectifier selector tubes 91 and 92, respectively.

The two selector tubes 91 and 92 are controlled to transmit the desired control impulses of proper polarity, according to the sequence outlined above, by a synchronously operated impulsing device 93 that impresses voltage upon the grids of the tubes 91 and 92 to transmit the control impulse of proper polarity at the right time to move the weld current stream in the desired direction.

The selector tubes 91 and 92 are gas-filled tubes that are rendered conductive when the cathode is negative to the anode and the grid slightly positive relative to the cathode, even though only momentarily. If the grid is negative relative to the cathode, the tube will not become conductive, even though the relative polarities of the cathode and of the anode are proper.

In order to block the selector tubes 91 and 92 against improper operation, the grids of the two tubes are normally biased slightly negative to their associated cathodes by a bias voltage, such as derived from a battery 94, applied to a balanced circuit including resistors 95 and 96 connected to the tube grids.

The selector tubes 91 and 92 are selectively rendered conductive, against the biasing voltage, by an operating voltage applied to the grids by the impulsing device 93. That device comprises a synchronous motor 97 driving a disc 98, with two pins 101 and 102, on opposite sides of the disc, to control the magnetic circuits of two impulsing transformers 103 and 104, to generate the impulsing operating voltages to be applied to the grids of the tubes 91 and 92.

Each impulsing transformer 103 and 104 consists of the core structure 105, a primary winding 106, and a secondary winding 107. A source of direct current 108 energizes the primary windings. The secondary windings are respectively connected to the grids of the two selector tubes 91 and 92. The core structure 105 has a gap, through which one of the pins on the disc will pass with each rotation of the disc. When the pin is in the gap, the reluctance of the core changes, and the resultant increase and decrease in the magnetic flux, due to the energization of the primary winding, induces a sharp peaked voltage in the secondary winding. That secondary peaked voltage momentarily overbalances the bias voltage and energizes the grid of the corresponding tube while the polarity of the control voltage is such as to render that tube conductive.

The two pins 101 and 102 are spaced apart one-third of the angular distance around the disc, and they are equally spaced from a zero starting point 110 on the disc. The zero point 110 on the disc should correspond in mechanical position to the electrical zero point of the control wave 39–a in Figure 26. The pin 101 should reach the gap of the core of impulsing transformer 103 at the zero point at the beginning of the negative wave 39–b, the second wave during the positive weld current wave. The pin 102 should reach the gap in the core of the impulsing transformer 104 at the zero point at the beginning of the positive wave 39–c, the third control frequency wave while the weld current is positive.

Thus, the impulsing device 93 will not operate during the interval of the first control frequency wave related to each weld current wave, so the selector tubes 91 and 92 will be blocked against conduction by the biasing voltage on the grids. During the second and third control frequency waves related to each weld current wave, the impulsing device sequentially energizes the grids, and renders the tubes sequentially conductive, to transmit the corresponding current waves of the control frequency, to sequentially energize the windings 88 and 89 of the magnet 71, to establish the flux in the magnet 71 in the desired directions to force the weld current stream to the seam surface edges, as previously explained.

The synchronous motor 97 of the impulsing device 93 is shown connected to the triple-frequency source 90. It may alternatively be connected to the fundamental welding current source, so long as the proper relation is first established between the position of the mechanical zero point 110 of the disc and the starting electrical zero point of the weld current and of the multiple-frequency control current. For insuring such mechanical and electrical synchronism, any suitable system may be employed for that purpose, such as shown, for example, in U.S. Patent No. 1,724,650 of Harold E. Fox, issued August 13, 1929.

For the purpose of illustration, the foregoing system of control is described as applied to a butt weld between two metal elements, shown here as the seam edges of thin-wall tube, and also between two thick metal sections which may be the seam edges of a thick-wall tube or pipe.

The system is similarly applicable to a lap weld with a narrow contact zone, except that the control magnet should be located to dispose the flux at right angles to the normal path, or direction of flow, of the weld current stream, between the two associated electrodes that carry the welding current. If the lap contact zone is narrow enough to be covered, in its width, by the weld spot of the progressively moving weld current stream, simple reverse or sweeping of the weld current stream back and forth on the lap area is sufficient to effect a complete weld over the entire lap area.

Where the lap contact zone is wider than the width of the weld spot formed by the weld current stream, the weld current stream should be controlled as in the case of the butt weld between thick walls, to have both a sweeping and a swinging action, through a path that will cause the weld current stream to traverse the entire surface area that is to be welded, thereby to heat that entire area to welding condition. Where the surfaces lap instead of butt, the magnetic control flux should be properly disposed to establish the control action to move the weld current stream as described, in the desired path to scan the area to be welded.

In Figures 44 to 50, is shown the manner in which a current stream is caused to scan a surface area to be welded, by a combined sweeping and swinging action of the current stream. The two inner directional symbols indicate that the same action takes place for the weld waves of both polarities.

In Figure 44, the circle 111 represents the weld current stream in the plane of the electrodes, and centrally between the upper and the lower edges of the seam surface.

In its position 112 in Figure 45, the weld current stream has been swept to the seam cleft, during the first control interval, corresponding to the time of control wave 39–a.

In Figure 46, the weld current stream has been swung upward to position 113, at the upper edge of the seam surfaces, for the beginning of control interval 39–b.

In Figure 47, the weld current stream has been swept along the upper edge through interval 39–b, to the right to position 114, which represents the right-hand extremity of its sweep movement, at the end of control interval 39–b.

In Figure 48, the weld current stream has been swung down to position 115, at the lower edge of the seam surfaces, for the beginning of control interval 39–c.

In Figure 49, the weld current stream has been reciprocated, or swept, leftwards, along the lower edges and through control intervals 39–c, to position 116, at the cleft. At this position the positive welding current wave diminishes to its zero value.

In Figure 50, the negative weld current wave starts at its normal intermediate position 117, corresponding exactly to the positive wave at position 111. The negative weld current wave is then controlled by its three control waves in the same manner and through a similar path as already described for the positive weld current wave in Figures 44 to 49, inclusive.

In Figure 51, is illustrated, schematically exploded, a series of weld stream paths that are progressively overlapped during the welding operation, to establish a continuous weld along every zone of the seam surfaces.

For the sake of simplifying the illustrations, the Figures 44 to 50 show merely the path of the current stream in its scanning movements, without considering the simultaneous advance of the pipe or other object being welded.

By such scanning action of the current stream, the entire seam surfaces become heated and welded. Because of the fast movement of the current stream relative to the seam surfaces, the heating and cooling action is rapid, and little time is presented for the metallurgical structure to change.

By suitably controlling and co-ordinating the pressure at the seam and the current supplied to the electrodes, according the speed of movement of the surfaces to be welded, the welding heat can be confined substantially to those surfaces, so that the metal which will be softened or melted on each surface, to intermingle and coalesce or weld, will form a relatively thin bonding layer between the metal behind the original surfaces. The layer of bonding metal, because of its relatively rapid cooling, becomes a strong fine grain structure.

The distribution of the heating effect of the current stream provides an equalized uniform heating condition comparable to direct current heating, and yet permits the use of alternating current with its attendant simplicity and flexibility of control.

A further result is the formation of a continuous weld over the entire surfaces without any unwelded areas or stress concentration zones.

The rapid heating and cooling action confines the heat generation to the seam surfaces and does not provide time for the heat to penetrate back into the body of the metal to form weakened side zones along the seam.

As previously mentioned, the desirable theoretical effects and benefits of a high frequency welding current are normally not procurable, because of the reactive impedances developed in a circuit by such high frequency current. Those effects and benefits are procurable, however, with the system disclosed herein, through the use of a multiple frequency or high frequency current for control uses only, instead of for the actual welding operation. The quantity of current required for the control action is considerably smaller than the welding current, and the impedance to the control current is sufficiently small to permit an effective control current to traverse its circuit.

For convenience and simplicity the control frequency is shown and adopted as a multiple of the fundamental welding current frequency, and preferably derived as a function of the fundamental frequency to simplify the problem of synchronizing the control current impulses with the weld current impulses to establish the desired control relationship.

The matter of phase relationship between the welding current and the control current has been assumed, in the foregoing description, to be as illustrated, with both currents in phase to the extent that zero points of both current waves are synchronous.

Since the heating effect is independent of the character of the current, that is, whether it is alterating or direct, the control system shown and described herein may be employed with direct welding current instead of with alternating current as shown herein. The advantages of the high speed welding operation are similarly achieved with direct welding current when so controlled. In that case any suitable control frequency may be employed, as desired.

The forming mechanism 3 of Figure 1 may be of any suitable construction that will form the strip progressively into a continuous cylinder. The side pressure rolls 11 and 12 should be adjustably mounted to permit their relative spacing and their side pressures against the tube or pipe to be adjustably varied.

The sweep magnet 36 for reciprocating the welding current has been illustrated merely as a simple structure having its pole pieces adjacent the electrode gap or plane. The extent of the pole piece dimension along the length of the seam, adjacent the electrodes, will govern the extent of the sweep of the weld current stream. The pole pieces may therefore be proportioned according to the length of the desired sweep movement.

An extension of the principle of the sweep magnet is illustrated in the modified magnet 45 of Figure 27, as an example of a means for establishing a travelling magnetic control flux field to sweep the welding current stream back and forth along the seam surfaces to be welded.

The control frequency generator 38, as previously explained, has been shown, for simplicity and by way of example, as a transformer arrangement to provide a third harmonic voltage having a frequency three times that of the fundamental frequency of the welding circuit. Other frequency generators, functionally equivalent, might equally well be employed, and other control frequencies may be employed, suitable for the requirements of the particular application to which the welding operation is applied.

In considering and explaining the positive control imposed upon the weld current stream by the control magnets, any incidental shifting of the current stream, of the kind illustrated in Figures 14, 15 and 16, have been disregarded, since the imposed control is not affected in its operation by such incidental shifting of the weld current stream.

In the general control system of Figure 43, only one type of control is shown, in which all of the control current is employed, or in which only selected impulses are taken and utilized for control purposes.

Other changes and modifications of the control system may be made, according to the requirements of the application where the welding operation is to be utilized, without departing from the spirit and scope of the invention, as set forth in the appended claims.

What is claimed is:

1. The method of electrically welding two engaging pieces of metal at their surfaces of engagement, which consists in passing an electric welding current substantially normal or perpendicular to and through the engaging weld surfaces, and establishing an electromagnetic flux field adjacent the zone of the weld current stream, the current and the flux field being so related that at least one is alternating with the flux field being disposed at such angle relative to the weld current stream and of such polarity relative to that of the weld current as to establish an electro-dynamic action on the weld current stream to cause the weld current to move and to scan the surfaces to be welded.

2. The method of electrically welding two engaging pieces of metal at their surfaces of engagement, which consists in passing an electric welding current substantially normal or perpendicular to and through the engaging weld surfaces, and establishing an electromagnetic flux field adjacent the zone of the weld current stream, with the flux field of such polarity and at such angle relative to the weld current stream as to establish an electro-dynamic action on the weld current stream to cause the weld current to shift its flow section or impingement area back and forth on the weld surfaces to progressively heat those surfaces as traversed by the current stream, the current and the flux field being so related that one is alternating.

3. The method of electrically welding two engaging pieces of metal at their surfaces of engagement, which consists in passing an electric welding current substantially normal or perpendicular to and through the engaging weld surfaces, and establishing an electromagnetic flux field adjacent the zone of the weld current stream with the flux field of such polarity and at such angle relative to the weld current stream as to establish an electro-dynamic action on the weld current stream to cause the weld current to shift its flow section to sweep the weld surfaces in a path having longitudinal and lateral directions, to progressively heat the entire engaged surface areas, the current and the flux field being so related that at least one is alternating.

4. The method of electrically welding two engaging pieces of metal at their surfaces of engagement, which consists in passing an electric welding current substantially normal or perpendicular to and through the engaging weld surfaces, and establishing an electromagnetic flux field, of greater frequency than the weld current, adjacent the zone of the weld current stream and at such angle relative to the weld current stream as to establish an electro-dynamic action on the weld current stream to cause the weld current to move and to scan the surfaces to be welded.

5. A method of manufacturing welded tubing or pipe from strip or skelp, which consists in folding the strip or skelp into cylindrical form to engage the seam edges progressively into butting contact, passing an electric welding current across the seam, in the region of the progressively butting contact, and setting up an alternating magnetic flux control field in that region of the path of the welding current stream, the magnetic flux control field being disposed physically and angularly relative to the current stream to establish an electro-dynamic action between the control flux field and the flux field of the weld current to cause the current stream to reciprocate longitudinally of the seam in the region of the progressive contact.

6. A method of manufacturing welded pipe from strip or skelp, which consists in folding the strip or skelp into cylindrical form to engage the seam edges progressively into butting contact, passing an electric welding current across the seam at one frequency in the region of the progressively butting contact, and in setting up an alternating magnetic flux control field of a higher frequency adjacent the path of the welding current stream, with such control field of proper polarity, duration, and angular disposition relative to the weld current, to react electrodynamically on the weld current, and to cause the weld current to scan the surfaces progressively engaging at the seam.

7. The method of electrically welding two engaging pieces of metal at their surfaces of engagement, which consists in passing an electric welding current substantially normal or perpendicular to and through the engaging weld surfaces, and establishing an electro-magnetic flux field, adjacent the zone of the weld current stream and at such angle relative to the weld current stream as to establish an electro-dynamic action on the weld current stream to cause the weld current to move and to scan the surfaces to be welded, and selectively controlling the polarity and duration of the flux field according to the direction of flow of the weld current, in order to control the duration and direction of the electro-dynamic forces acting upon the weld current stream.

8. Welding apparatus for welding two metal parts, comprising an electrode to engage each part; a source of welding current connected to the electrodes, the electrodes being disposed to engage the parts on opposite sides of the weld surfaces so the current will cross from one weld surface to the other; electro-magnetic means for establishing magnetic flux control fields adjacent the weld zone and the path available in that zone for the weld current so the flux field will react electro-dynamically on the weld current stream; and means for controlling the energization of the electro-magnetic means to control the duration, the timing and the polarity of the control fields to govern the electro-dynamic reaction between the fields and the weld current and thereby govern the design of a path of movement of the weld current section along the weld surfaces.

9. Welding apparatus for progressive seam welding between two metal elements, comprising an electrode for engaging each element on opposite sides of the seam to be welded, so the weld current between the electrodes will pass through the surfaces from one surface to the other; a source of welding current connected to the electrodes; electro-magnetic means for establishing a magnetic flux control field adjacent the weld zone and the path available in that zone for the weld current so the flux field will react electro-dynamically on the weld current stream, to cause the weld current stream to scan the weld surfaces; a source of energy for the electro-magnetic means; and means for selectively controlling the transfer of energy to said electro-magnetic means including electric valve means, and timing means for controlling the valves to render them conductive for selected intervals.

10. The method of electric resistance welding, which consists in passing a welding current between two surfaces to be welded, and in setting up, adjacent the adjoining surfaces, a magnetic flux field, having two directional time components and having proper polarity and angular disposition to be electrodynamically effective relative to the welding current, thereby to establish electro-dynamic action between the flux field and the welding current stream as a movable conductor, to effect movement of the welding current stream in a path of pre-determined pattern, as controlled by the flux field form, disposition, polarity and frequency, and thereby cause the welding current stream section to sweep and scan the areas of the two surfaces in accordance with said pattern.

11. In an alternating current welding system, for welding two metallic members at pre-determined surface areas, the combination with means for supplying a welding current to the members so the current will cross between the surfaces to be welded, of electro-magnetic means, operative, when energized, to establish magnetic flux fields of predetermined polarities, and of such duration and so located, relative to the welding current stream, as to set up electro-dynamic reactions against said welding current stream, that will move the flow section of the welding current stream in a predetermined pattern, irrespective of any relative movement between the metallic members and the current-supplying means, and means for selectively controlling the energization of said electro-magnetic means for selective time intervals during the establishment of such predetermined polarities, to cause the current stream to scanningly traverse, heat and weld the surfaces along the outer or contour edges of the pre-determined weld surface areas to ensure complete welding of the surface areas.

12. In a welding system for electrically welding two metallic members at pre-determined surfaces, the combination with means for pressing the surfaces to engagement, electrodes for engaging the two members on opposite sides of the welding zone of engagement of the two surfaces to cause the current to flow from one surface to the other surfaces so as to impress a potential difference between the two surfaces, and means for supplying a welding current to the electrodes for transmission through the surfaces to be welded, of means independent of the welding circuit and disposed adjacent the welding zone to establish a magnetic flux field perpendicular to the normal direction of current flow, and of proper polarity and duration relative to the weld current stream, for electro-dynamically shifting the flow section of the weld current stream in a pre-determined path having a substantially longitudinal component to cause the weld current stream to flow through selected areas of the surfaces to be welded.

13. In a welding system for welding two metal elements at, and over the area of, two contacting surfaces, the method of controlling the location of the weld current stream section to cause that current stream section to scanningly traverse the surface areas, which consists in establishing an electro-magnetic control flux field adjacent the contacting surfaces, with the flux field of suitable polarity and so angularly disposed relative to the current stream as to establish an electro-dynamic reaction on the weld current, to move the current stream section is a desired longitudinal direction; and in establishing said control flux field by a current of sinusoidal form.

14. The method of resistance welding two surfaces, engaged over a longitudinal area, which consists in passing a weld current stream between and substantially perpendicularly across the two surfaces; setting up an electro-magnetic flux field perpendicularly to the current stream with the flux of proper polarity to establish an electro-magnetic reaction to force the current stream to one contour edge of the area of engagement of the two surfaces; and setting up a second electro-magnetic flux field disposed to be electro-dynamically effective to shift the current stream longitudinally along said contour edge in a desired direction.

15. The method of resistance welding two surfaces, engaged over a longitudinal area, which consists in passing a weld current stream between and substantially perpendicularly across the two surfaces; setting up an electro-magnetic flux field perpendicularly to the current stream and of proper polarity to establish an electro-magnetic reaction to force the current stream to one contour edge of the area of engagement of the two surfaces; and setting up a second electro-magnetic flux field disposed to be electro-dynamically effective to shift the current stream along said contour edge in a desired direction and to be of proper polarity and duration to shift the current stream back and forth along said contour edge.

16. The method of electrically welding two jointly moving progressively engaging metallic surfaces, which consists in passing an electric current between the two progressively engaging surfaces adjacent the progressively moving point of contact, and setting up an alternating magnetic flux field adjacent the current stream and substantially perpendicular to the current stream to cause the current stream to reciprocate longitudinally along the engaged traveling seam edges on the weld surfaces in the region where they are progressively engaged.

17. The method of electrically resistance-welding two metallic surfaces, which consists in engaging the two surfaces with a relatively light contact pressure to establish an electrical resistance across such contacting surfaces that is many times the resistance of an equal area of the body metal, passing an electric current across the contacting zone, and establishing an electro-magnetic flux control field adjacent the contacting zone, one of the said currents and the said flux field being alternating, and the flux field being so disposed angularly relative to the current stream as to set up an electro-dynamic reaction to sweep the current along the contacting zone to cause the heating time and effect of the current to be of relatively short duration, and too fast to permit an accumulated heating effect that would be sufficient to cause melting and dropping out of the metal.

18. The method of electric resistance-welding, which consists in passing an electric current substantially at right angles to and between two surfaces to be welded, and in setting up a separate electro-magnetic flux control field to electro-magnetically control the welding current to cause the current stream to move so its impingement area on the weld surfaces will revolve in a path closing upon itself on the weld surfaces, the welding current and the flux control field being so related that one is alternating, and the flux field is angularly disposed to the path of the current stream between the two surfaces.

19. Welding apparatus for electric resistance-welding, comprising means for supporting two metallic members to hold their surfaces in position as they are to be welded, electrodes for engaging the metallic members to conduct the welding current thereto, a source of energy connected to the electrodes, electro-magnetic means adjacent the welding surfaces and the electrodes to establish a magnetic control flux adjacent to and substantially at right angles to the current stream to move the welding current stream through a predetermined path in the weld zone, and means for energizing the electro-magnetic means to establish a control flux of proper polarity to move the welding current in a desired path over an area in the weld zone to scan the weld surfaces in that weld zone.

20. A system for progressively welding two metallic members along selected surface areas, comprising means for engaging the areas of the two surfaces in the position at which they are to be welded, electrode means to be applied to the metallic members to transmit welding current to the two members to cross the areas of the plane of engagement of the engaging surfaces, a source of welding energy connected to the electrodes, electro-magnetic means adjacent the current path between the electrodes to set up a magnetic flux field substantially perpendicular to the weld current to establish an electro-dynamic action to shift the flow section of the welding current stream in said path between the electrodes, a source of alternating polarity energy for the electro-magnetic means to enable said means to set up a field to effect movement of the flow section of the weld current stream in one pair of opposite directions in the plane of the weld surfaces, and second electro-magnetic means to set up a flux to move the current stream in a second dimensional direction in said plane, and a source of energy for said second electro-magnetic means.

21. A system for progressively welding two metallic members along selected surface areas, comprising means for engaging the areas of the two surfaces in the position at which they are to be welded, electrode means to be applied to the metallic members to transmit welding current to the two members to cross through the engaging areas of said surfaces, a source of welding energy connected to the electrodes, electro-magnetic means adjacent the current path between the electrodes to set up a magnetic flux field to shift the welding current stream, a source of energy of alternating polarity for the electro-magnetic means to enable said means to effect movement of the flow section of the weld current stream in one set of opposite directions in the plane of the weld surfaces, and second electro-magnetic means to set up a flux to move the current stream in a second dimensional direction in said weld plane, a source of alternating polarity energy for the second electro-magnetic means, and means for selectively supplying energy impulses of selected polarity to both the electro-magnetic means in predetermined time sequence.

22. The method of welding two metallic members at and along predetermined engaging surface areas, which comprises transmitting a welding current across the two members and through said surfaces, and simultaneously establishing an electro-magnetic flux field adjacent said surface areas and the stream of the welding current, the current and the flux being so related that at least one is alternating, with the flux field disposed perpendicularly to the weld current stream and in such position tangentially relative to the current stream and in such magnetic direction relative to the current direction, as to shift the weld current stream to move its flow section through a path of predetermined pattern laterally in the plane of the engaging surface areas, to cause the weld current stream to traverse and heat the entire areas of the surfaces to be welded.

23. The method of welding two metallic members at and over predetermined surface areas of engagement between the two members, which comprises moving said surface areas progressively into engagement of relatively high electrical resistance; passing an electric welding current substantially normal or perpendicular to and through the engaging weld surfaces of sufficient amplitude relative to the high resistance of engagement to effect melting of a thin surface layer of and at the engaging surface areas; and establishing an electro-magnetic flux field adjacent the zone of the weld current stream and so disposed relative to the magnetic flux of the welding current stream as to cause an electro-dynamic action on the weld current stream to cause the weld current to move and scan the weld surfaces at a speed faster than the rate of progressive surface engagement, whereby the weld surfaces will be subjected to a fast high heating effect and a subsequent fast cooling effect, that will establish a strong weld characterized by a fine grain bonding layer resulting from the thin layer of molten metal being quickly cooled.

References Cited in the file of this patent

UNITED STATES PATENTS

| | | |
|---|---|---|
| 477,101 | Coffin | June 14, 1892 |
| 1,435,306 | Johnston | Nov. 14, 1922 |
| 1,651,438 | Borgadt | Dec. 6, 1927 |
| 2,016,414 | Cramer | Oct. 8, 1935 |
| 2,086,305 | Sessions | July 6, 1937 |
| 2,139,211 | Sessions | Dec. 6, 1938 |
| 2,205,425 | Leonard | June 25, 1940 |